United States Patent [19]

Mraz

[11] Patent Number: 4,820,095

[45] Date of Patent: Apr. 11, 1989

[54] ANCHOR DEVICE FOR SECURING ROCK BOLTS

[75] Inventor: Dennis Mraz, Saskatoon, Canada

[73] Assignee: Engineered Instruments, Inc., Canada

[21] Appl. No.: 160,640

[22] Filed: Feb. 26, 1988

[51] Int. Cl.[4] .................. F16B 39/02; E21B 20/02
[52] U.S. Cl. .................... 411/82; 411/258; 405/261; 52/704
[58] Field of Search .............. 411/23, 69, 82, 258, 411/61; 405/260, 261; 52/704; 206/219

[56] References Cited

U.S. PATENT DOCUMENTS

| Re. 25,869 | 10/1965 | Schuermann et al. | 405/261 |
|---|---|---|---|
| 2,092,341 | 9/1937 | De Vries | 52/704 |
| 2,849,866 | 9/1958 | Flygare et al. | |
| 3,699,687 | 10/1972 | Bourland | |
| 3,877,235 | 4/1975 | Hill | 405/261 |
| 3,901,039 | 8/1975 | Lundkvist | |
| 4,224,971 | 9/1980 | Muller et al. | |
| 4,279,340 | 7/1981 | Lang | 206/219 |
| 4,354,782 | 10/1982 | Newport | 411/61 |

FOREIGN PATENT DOCUMENTS

| 1902045 | 8/1970 | Fed. Rep. of Germany | 405/261 |
|---|---|---|---|
| 1381286 | 1/1975 | United Kingdom | 411/69 |

Primary Examiner—Neill A. Wilson
Attorney, Agent, or Firm—Welsh & Katz, Ltd.

[57] ABSTRACT

Anchor device for securing a rock bolt in a borehole, comprising an elongated cage having a perforated elongated wall confining an elongated chamber containing a bonding means for bonding the rock bolt within the borehole, the cage having a trailing end adapted to mount the anchor device onto the leading end of a rock bolt for insertion into the borehole.

11 Claims, 1 Drawing Sheet

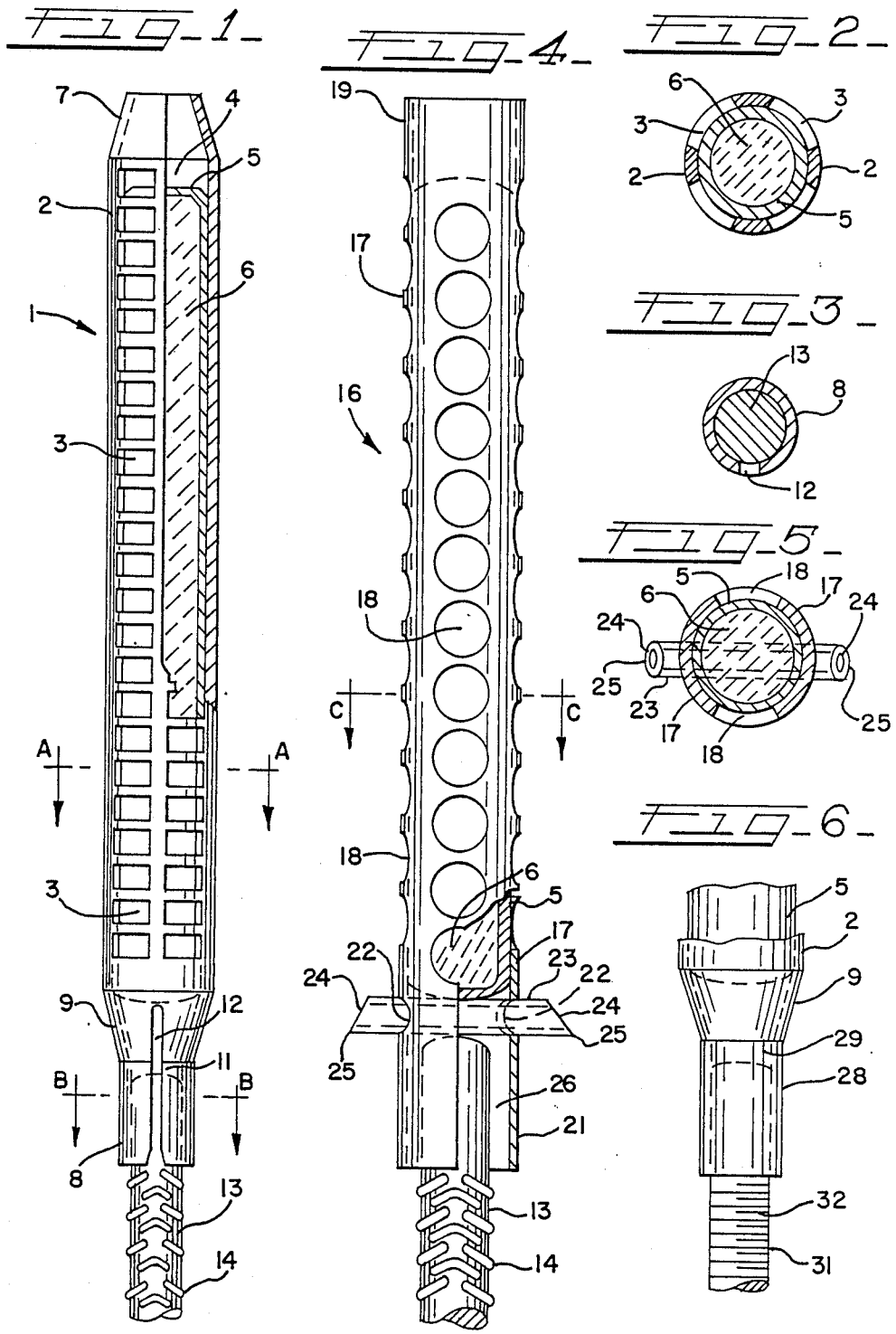

ANCHOR DEVICE FOR SECURING ROCK BOLTS

BACKGROUND OF THE INVENTION

The present invention relates to a method and means for carrying out the rock bolting of a roof or a hanging wall in a mine, a shaft, a tunnel, or generally in any cavity in the rock, by means of bolts which are fastened in boreholes. The invention may also be applied in cases where it is desired to establish in the roof, or on the wall, a means for attaching a hook, loop, or some other device which will be subjected to heavy loads and which, therefore, must be safely anchored.

The general method of fastening bolts in boreholes has been practiced for a long time. The earlier method fundamentally comprised inserting an apertured tubular member having a smaller diameter than the borehole diameter and containing a cement, mortar, or similar bonding material, into the borehole, and thereafter introducing a bolt having a smaller diameter than said tubular member into the tubular member to force the mortar out through the apertures thereof. Besides filling the annular space between the bolt and the tubular member, the mortar will also fill the annular space between the tubular member and the borehole wall, and after setting it will form a hard body which will rigidly bond and anchor the bolt within the rock at least along a substantial portion of its length.

The currently preferred method for bonding a rock bolt within a borehole is to use an adhesive cartridge which is inserted into the borehole. The adhesive cartridge is ruptured in the borehole to produce a resin adhesive which then hardens to bond the bolt in the borehole. The cartridge contains a plurality of chemical components comprising at least a resin component and a hardener component. These components must be intermixed in the borehole in order to interreact to produce a hardenable adhesive. Generally, the adhesive may comprise a base resin, a hardening compound, and inert filler. In order to assure that the chemical components do not interreact with each other to produce the hardenable adhesive before placement of the cartridge and the rock bolt into the borehole, the reactive components are conventionally isolated from each other within the cartridge. Isolation of the components is accomplished by separating the components from each other by one or more frangible partitions within the cartridge. Penetration of the cartridge by the rock bolt will cause rupture of the cartridge and rupture of the frangible partitions. As the rock bolt progresses into the cartridge, it causes intermixing of the various components so that the components will react with each other to produce the hardenable resin adhesive. Within a short time, the resin adhesive sets or hardens and thereby bonds the rock bolt firmly within the borehole.

The insertion of the cartridge within the borehole is easy if the borehole slants downwardly. However, if the borehole slants upwardly, or is overhead in the roof of the tunnel or mine, difficulty is experienced because the cartridge can fall out of the borehole before the bolt is inserted. Thus, the workers in the mine must hold the cartridge in the hole manually while trying to put the bolt in. This is labor intensive and does not lend itself easily to automation.

Accordingly, it is an object of the present invention to provide a novel method for anchoring a rock bolt or the like within a borehole which provides improved efficiency over the prior techniques.

It is a further object of the present invention to provide a novel anchoring device for use with a rock bolt and the like.

These and other objects of the invention, as well as the advantages thereof, will become more clear from the disclosure which follows.

SUMMARY OF THE INVENTION

The present invention comprehends an anchor device for securing a rock bolt in a borehole. The anchor device comprises an elongated cage having a perforated elongated wall confining an elongated chamber. The chamber contains a bonding means, such as a resin cartridge, for bonding the rock bolt within the borehole. The cage has a trailing end which is adapted to mount the anchoring device and the contained bonding means onto the leading end of the rock bolt for insertion into the borehole. Since the bonding means, such as a resin cartridge, is contained within the cage and the cage is mounted on the leading end of the rock bolt, the bonding means and the rock bolt can be inserted into the borehole as a unit in a single operation. Thus, the insertion of the cartridge and the rock bolt is made more easy by the device of the present invention.

DESCRIPTION OF THE DRAWINGS

An understanding of the present invention may be readily accomplished from the following description in light of the accompanying drawings.

FIG. 1 is an elevational view, partly in section, illustrating one embodiment of the present invention.

FIG. 2 is a sectional view of the embodiment of FIG. 1 taken along section line A—A.

FIG. 3 is a sectional view of the embodiment of FIG. 1 taken along section line B—B.

FIG. 4 is an elevational view, partly in section, of a second embodiment of the present invention.

FIG. 5 is a sectional view of the embodiment of FIG. 4 taken along section line C—C.

FIG. 6 is an elevational view of the trailing end of the embodiment of FIG. 1, illustrating an alternative mounting means.

DESCRIPTION OF THE PREFERRED EMBODIMENTS

Referring now to FIG. 1 there is shown a first embodiment of the anchor device of the present invention comprising an elongated cage 1 having an elongated wall member 2 containing rectangular perforations 3 therein. Preferably, elongated wall 2 is cylindrical in shape. The elongated wall 2 confines an elongated chamber 4 which contains a bonding means such as a cartridge 5 containing a bonding composition 6. The bonding composition 6 may comprise a cement or mortar for bonding a rock bolt firmly within a borehole, but a preferred embodiment of the bonding composition is a two component chemical system comprising a resin and a hardener.

Such resins and hardeners are well known in the art. The hardener is a cross linking agent, which upon contact and thorough intermixing with the resin will cause the resin to gel by cross linking and thereby set up to form a very hard bonding agent. In order to keep the hardener and the resin isolated until the moment of use, the two components are kept apart by frangible partitioning means. The partitioning means may be a frangible microencapsulation coating which may cover either one or both of the components in a plurality of intermixed microspheres. The components remain isolated from each other until the rock bolt penetrates the cartridge and crushes the microspheres. Alternatively, the partitioning means may be a plurality of elongated sheaths or bags of frangible plastic which confine the hardener and the resin separately so that they are not in contact with each other until the bags are ruptured by the rock bolt. A third method of keeping the two components from contact with each other is to provide a frangible partition member within the cartridge as an internal element thereof, which fractures as the rock bolt enters the cartridge. Since these partitioning means are all frangible, when the cartridge 5 is ruptured, the partitioning means, not shown in the Figures, will either tear, rupture, or fracture when the rock bolt penetrates into the cartridge, and the hardener and resin will become intermixed and react as the rock bolt passes through the length of the cartridge.

The elongated cage 1 has a leading end 7 which enters the borehole first and a trailing end which enters the borehole last. The trailing end comprises a necked down transition section 9 fixed to an elongated section 8. The bottom of resin cartridge 5 rests in the top of this necked down section 9. This necked down section 9 is in the shape of a truncated cone and the elongated section 8 is preferably cylindrical. A rock bolt 13 is forced into a central bore 11 which is contained within the elongated section 8 so that there is a tight compression fit of the rock bolt within the bore 11. The bore 11 is in open communication with the chamber 4 so that the rock bolt may eventually contact and penetrate the resin cartridge 5. In order to facilitate the penetration of the rock bolt within the bore 11 there is optionally provided at least one elongated slot 12.

The rock bolt 13 commonly will have surface ridges or teeth 14 on its outer surface which are adapted to provide an enhanced bonding surface for contact with the bonding agent which sets up in the borehole. As shown in FIG. 1, these ridges or teeth on the surface are in the configuration of a chevron which is oriented with the apex of the chevron pointed toward leading end 7 so as to resist the pulling of the rock bolt from the interior of the cage and from the bonding agent when the bonding agent has hardened. It is to be noted that the tight compression fit of rock bolt 13 within elongated section 8 prevents premature puncture of the resin cartridge by the rock bolt as the assembly is being pushed down the borehole.

FIG. 2 shows a sectional view of the elongated cage 1 of FIG. 1 taken along section line A—A. In FIG. 2 there is shown the elongated wall member 2 containing perforations 3, and confined therein is the cartridge 5 containing the bonding composition 6.

FIG. 3 is a sectional view of the elongated cage of FIG. 1 taken along sectional line B—B. There is shown in FIG. 3 the elongated section 8 at the trailing end of the cage 1 and confined therein is the rock bolt 13. Also shown is a slot 12 which allows the elongated section 8 to expand as the rock bolt enters the bore 11 of section 8.

An alternative embodiment is illustrated in FIG. 4. FIG. 4 shows a cage 16 having an elongated wall 17 containing circular perforations 1. Confined within the chamber of the cage 16 is a bonding means such as cartridge 5 containing a bonding composition 6. As seen in FIG. 4, this embodiment is a substantially tubular elongated cage having a leading end 19 and a trailing end 21, with no necked down portion at the trailing end. The cartridge 5 is supported within the chamber by a pin 23 which passes through the chamber wall 17 by means of apertures 22 on opposite sides of the wall. The pin 23 may be a solid dowel or rod, or it may be a tubular pin having a hollow center as shown in FIGS. 4 and 5. As will be noted in FIGS. 4 and 5, the pin has end faces 24 which are at an angle to the axis of the pin. These end faces 24 provide pointed ends 25 on the pin in order to facilitate the insertion of the pin 23 into the holes 22 for the passage of the pin through the elongated cage 16.

Trailing end 21 of elongated cage 16 is an elongated section which contains a central bore 26 in communication with the chamber holding the cartridge 5. The bore 26 is substantially the same diameter as the bore of the chamber within the cage 16 so that a rock bolt 13 having surface ridges 14 may enter the trailing end of the cage with a loose fit. As seen in FIG. 4, when the pin has been inserted into the cage 16 the resin cartridge 5 will rest upon the top of the pin 23 and the pin will rest upon the leading end of the rock bolt 13 when the cage is oriented in a position whereby the trailing end 21 is below the leading end 19. It is to be noted that the pin prevents premature puncture of the resin cartridge by the rock bolt as the assembly is being pushed down the borehole.

FIG. 5 gives a sectional view of the embodiment of FIG. 4 and illustrates the various elements thereof. In particular, the pin 23 is shown with the slanted end faces 24 which provide the pointed ends 25 on the pin. Also shown are the elongated wall 17, circular perforations 18, and the cartridge 5 containing the bonding composition 6.

FIG. 6 illustrates an alternate method of mounting the cage upon a rock bolt. In FIG. 6 there is shown the trailing end of the cage of FIG. 1, which comprises elongated the wall 2, the transition section 9 and an elongated section 28. The elongated section 28 has a central bore 29 which is in open communication with the chamber in which the cartridge 5 is held. The inner surface of bore 29 is threaded with spiral threads, not shown, which are sized and adapted to mate with external threads 32 which are on the outside surface of the leading end of rock bolt 31. It is to be noted that the mated threads prevent premature puncture of the resin cartridge by the rock bolt as the assembly is being pushed down the borehole.

It will be apparent to those skilled in the art that the embodiments shown illustrate means by which a cartridge containing a bonding agent can be attached quickly to a rock bolt in a manner which enables the worker to insert the cartridge and the rock bolt into the borehole as a single act since the two parts are coupled together as a unit. This saves on labor and avoids the problem of having the cartridge fall out of the borehole before the rock bolt can be inserted therein when the borehole is inclined downwardly toward the worker or the borehole is overhead.

Once the cage with its confined resin cartridge has been pushed all the way to the bottom of the borehole, the rock is pushed with a substantial force which is sufficient to cause the rock bolt to pass through the elongated section of the cage and penetrate the resin cartridge for the mixing and reaction of the bonding composition. In the embodiment of FIG. 1, the elongated section 8 will expand to allow passage of the rock bolt therethrough and/or the cage 1 may fracture to allow penetration of the resin cartridge. In the embodiment of FIG. 4, the pin 23 and/or the cage 16 may fracture to allow the rock bolt to penetrate the cartridge. In the embodiment of FIG. 6, the threads on the inner surface of the bore 29 of elongated section 28 will normally shear off and/or the cage may fracture to allow penetration of the cartridge by the rock bolt.

Preferably, the various embodiments of the inventive anchoring device will comprise a cage which is fabricated of polyethylene, although other materials may be used. For example, rigid polyvinylchloride or other plastics could be used, as well as metals such as steel. The pins used on the embodiment of FIGS. 4 and 5 may be fabricated of wood or plastic or metal, and they may be in the form of a solid rod or of a hollow tube. The pin has been shown in FIGS. 4 and 5 to be a hollow tube, and this is preferred since it will break more easily when the rock bolt is required to penetrate the cartridge. In general, it is preferable that the material of fabrication for the cages and the pins be softer and/or more frangible than the rock bolt in order to assure that the rock bolt will easily penetrate the resin cartridge at the bottom of the borehole.

Although the present invention has been described with preferred embodiments illustrated herein, it is to be understood that modifications and variations may be resorted to without departing from the spirit and scope of this invention, as those skilled in the art will readily understand. For example, the embodiments are shown with perforated elongated walls, and the shape and spacing of the perforations can be varied. Alternatively, the walls could comprise an open mesh structure by utilizing a woven screen and the like. Such modifications and variations are considered within the purview and the scope of the appended claims.

What is claimed is:

1. Anchor device for securing a rock bolt in a borehole, said anchor device comprising an elongated cage having a perforated elongated wall confining an elongated chamber, said chamber containing bonding means for bonding the rock bolt within the borehole, said cage having a leading end and a trailing end, and said trailing end comprising an elongated section having a central bore in communication with said chamber, said bore being sized to receive the leading end of a rock bolt, and a pin passing transversely through said elongated section adjacent to said chamber, whereby said bonding means rests upon said pin and said pin rests upon said rock bolt when the cage is mounted on the rock bolt with said trailing end located below said leading end of said cage.

2. Anchor device of claim 1 wherein said elongated section is a cylindrical section.

3. Anchor device of claim 1 wherein said bore of said elongated section is sized to receive said rock bolt in a loose fit.

4. Anchor device of claim 1 wherein said trailing end comprises an elongated section having a transverse dimension smaller than the transverse dimension of said perforated elongated wall, and having a central bore in communication with said chamber.

5. Anchor device of claim 1 wherein said elongated cage, said elongated wall and said elongated chamber are cylindrical.

6. Anchor device of claim 1 wherein said bonding means comprises a frangible cartridge containing at least two interreactive compounds separated by frangible partitioning means, whereby penetration of said cartridge by a rock bolt will cause said partitioning means to rupture and said compounds to thereby intermix and react to produce a hardenable adhesive compound.

7. Anchor device for securing a rock bolt in a borehole, said anchor device comprising an elongated cage having a perforated elongated wall confining an elongated chamber, said chamber being adapted to receive and contain bonding means for bonding the rock bolt within the borehole, said cage having a leading end and a trailing end, and said trailing end comprising an elongated section having a central bore in communication with said chamber, said bore being sized to receive the leading end of a rock bolt, and a pin passing transversely through said elongated section adjacent to said chamber, whereby a bonding means placed within said chamber rests upon said pin and said pin rests upon said rock bolt when the cage is mounted on the rock bolt with said trailing end located below said leading end of said cage.

8. Anchor device of claim 7 wherein said elongated section is a cylindrical section.

9. Anchor device of claim 7 wherein said bore of said elongated section is sized to receive said rock bolt in a loose fit.

10. Anchor device of claim 7 wherein said trailing end comprises an elongated section having a transverse dimension smaller than the transverse dimension of said perforated elongated wall.

11. Anchor device of claim 7 wherein said elongated cage, said elongated wall and said elongated chamber are cylindrical.

* * * * *

UNITED STATES PATENT AND TRADEMARK OFFICE
CERTIFICATE OF CORRECTION

PATENT NO. : 4,820,095

DATED : April 11, 1989

INVENTOR(S) : Dennis Mraz

It is certified that error appears in the above-identified patent and that said Letters Patent is hereby corrected as shown below:

In Column 3, Line 65, "perforation 1" should be —perforation 18—.

In Column 4, Line 63, "rock" should be —rock bolt—.

Signed and Sealed this

Second Day of January, 1990

Attest:

JEFFREY M. SAMUELS

Attesting Officer    Acting Commissioner of Patents and Trademarks